US010821883B2

(12) United States Patent
Murase et al.

(10) Patent No.: US 10,821,883 B2
(45) Date of Patent: Nov. 3, 2020

(54) HEADLAMP CONTROL DEVICE FOR VEHICLE

(71) Applicant: TOYOTA JIDOSHA KABUSHIKI KAISHA, Toyota (JP)

(72) Inventors: Yukimi Murase, Toyota (JP);
Kazuhiko Nakashima, Miyoshi (JP);
Yoshiharu Okabe, Okazaki (JP);
Tomonari Sawada, Nagoya (JP);
Tomoyuki Watanabe, Nagoya (JP);
Haruya Iwatsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/836,055

(22) Filed: Mar. 31, 2020

(65) Prior Publication Data

US 2020/0317115 A1   Oct. 8, 2020

(30) Foreign Application Priority Data

Apr. 8, 2019  (JP) .................................. 2019-073494

(51) Int. Cl.
*B60Q 1/08*  (2006.01)
*B60Q 1/14*  (2006.01)
(52) U.S. Cl.
CPC ............. *B60Q 1/1423* (2013.01); *B60Q 1/08* (2013.01); *B60Q 2300/42* (2013.01)

(58) Field of Classification Search
None
See application file for complete search history.

(56) References Cited

U.S. PATENT DOCUMENTS

2006/0177098 A1* 8/2006 Stam .................. G06K 9/00791
382/104
2007/0276551 A1  11/2007 Brod
2011/0260618 A1* 10/2011 Mueller ............... B60Q 1/1423
315/83

FOREIGN PATENT DOCUMENTS

EP       2669115 A1   12/2013
GB       2497646 A     6/2013
JP    2008-529873 A    8/2008

* cited by examiner

*Primary Examiner* — Dedei K Hammond
(74) *Attorney, Agent, or Firm* — Hunton Andrews Kurth LLP

(57) ABSTRACT

A control unit of a headlamp control device for a vehicle is configured so that, when an occupant of the vehicle performs a predetermined interruption operation while the illumination mode of a headlamp is a high beam mode during automatic illumination control, the control unit sets the illumination mode to a low beam mode until an interruption time passes. The interruption time is set to a smaller value as a vehicle speed correlation value is larger. The vehicle speed correlation value is a value that increases as a speed at which the vehicle has been traveling since the start of the interruption operation is higher.

2 Claims, 5 Drawing Sheets

HEADLAMP CONTROL DEVICE FOR VEHICLE

INCORPORATION BY REFERENCE

The disclosure of Japanese Patent Application No. 2019-073494 filed on Apr. 8, 2019 including the specification, drawings and abstract is incorporated herein by reference in its entirety.

BACKGROUND

1. Technical Field

The disclosure relates to headlamp control devices for vehicles which perform automatic illumination control in which the illumination mode of a vehicle headlamp is automatically switched between a low beam mode and a high beam mode.

2. Description of Related Art

One headlamp control device of related art (hereinafter sometimes referred to as the "related art device") can maintain the illumination mode of the headlamp desired by the driver (that is, either the low beam mode or the high beam mode) when he/she performs a predetermined lever operation during automatic illumination control (see, e.g., Japanese Unexamined Patent Application Publication No. 2008-529873 (JP 2008-529873 A)). For example, when the driver notices a pedestrian ahead of the vehicle while the illumination mode is the high beam mode by automatic illumination control and he/she performs a predetermined lever operation, the related art device can switch the illumination mode to the low beam mode without stopping the automatic illumination control.

SUMMARY

In this case, it is desirable that the illumination mode automatically return to the high beam mode without any operation being performed by the driver after the illumination mode is switched to the low beam mode. Devices are therefore under study which switch the illumination mode from the high beam mode to the low beam mode when the driver performs a predetermined operation (interruption operation) during automatic illumination control and automatically return the illumination mode to the high beam mode after the elapse of a predetermined time (interruption time) from the switching of the illumination mode to the low beam mode. The process of maintaining the low beam mode during the interruption time after the interruption operation is performed is sometimes referred to as the "high beam interruption process."

However, when the interruption time is too short, the illumination mode may return to the high beam mode even though a pedestrian is still present far ahead of the vehicle. On the other hand, when the interruption time is too long, the low beam mode may be maintained for a long time after the vehicle passed the pedestrian. As described above, when the interruption time is not appropriately set, the driver of the vehicle may feel dissatisfied with the high beam interruption process.

The disclosure provides a headlamp control device for a vehicle which reduces the possibility that the driver may feel dissatisfied by setting the interruption time to a more appropriate value.

An aspect of the disclosure relates to a headlamp control device for a vehicle.

The headlamp control device includes a headlamp and a control unit.

The headlamp is mounted on the vehicle and is configured to illuminate ahead of the vehicle in an illumination mode that is either a low beam mode or a high beam mode.

The control unit performs automatic illumination control in which the illumination mode of the headlamp is automatically switched between the low beam mode and the high beam mode based on a traveling state of the vehicle.

The control unit is configured so that, when an occupant of the vehicle performs a predetermined interruption operation while the illumination mode is the high beam mode during the automatic illumination control, the control unit sets the illumination mode to the low beam mode until an interruption time passes. The interruption time is set to a smaller value as a vehicle speed correlation value is larger. The vehicle speed correlation value is a value that increases as a speed at which the vehicle has been traveling since the start of the interruption operation is higher.

The vehicle speed correlation value is, e.g., a traveling speed of the vehicle at the time of completion of the interruption operation. Alternatively, during a high beam interruption process, the distance traveled by the vehicle since the "start of the high beam interruption process" (i.e., the integral of the traveling speed over time) may be used as the vehicle speed correlation value, and the interruption time may be set so that the larger this vehicle speed correlation value (i.e., the distance traveled) is, the shorter the "remaining interruption time (i.e., the time from the current time until the high beam interruption process is terminated)" is.

Since the control unit appropriately sets the interruption time, the high beam interruption process is highly likely to be terminated (i.e., the illumination mode is highly likely to return from the low beam mode to the high beam mode) at the timing expected by the driver. Accordingly, the headlamp control device of the above aspect reduces the possibility that the driver may feel dissatisfied with the high beam interruption process.

In the above aspect, the headlamp control device may further include a target information obtaining unit configured to detect an illumination target and obtain a distance between the detected illumination target and the vehicle. The illumination target is a target of a specific type located ahead of the vehicle. The control unit may be configured so that, in a case where the illumination target has been detected when the interruption operation is performed while the illumination mode is the high beam mode during the automatic illumination control, the control unit sets the interruption time to a larger value as the distance between the illumination target and the vehicle is larger.

For example, the illumination target may include a bicycle in addition to a pedestrian. According to the above aspect, when the traveling speed of the vehicle is the same, the interruption time is set to a larger value when the distance to the illumination target is large (i.e., when it takes long for the vehicle to pass the illumination target) than when the distance to the illumination target is small. According to the above aspect, the interruption time is thus set more appropriately, and the possibility that the driver may feel dissatisfied with the high beam interruption process is therefore further reduced.

Other structures and their associated advantages of the disclosure will be readily understood from the following description of an embodiment of the disclosure which is given with reference to the accompanying drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration

Figure 1:
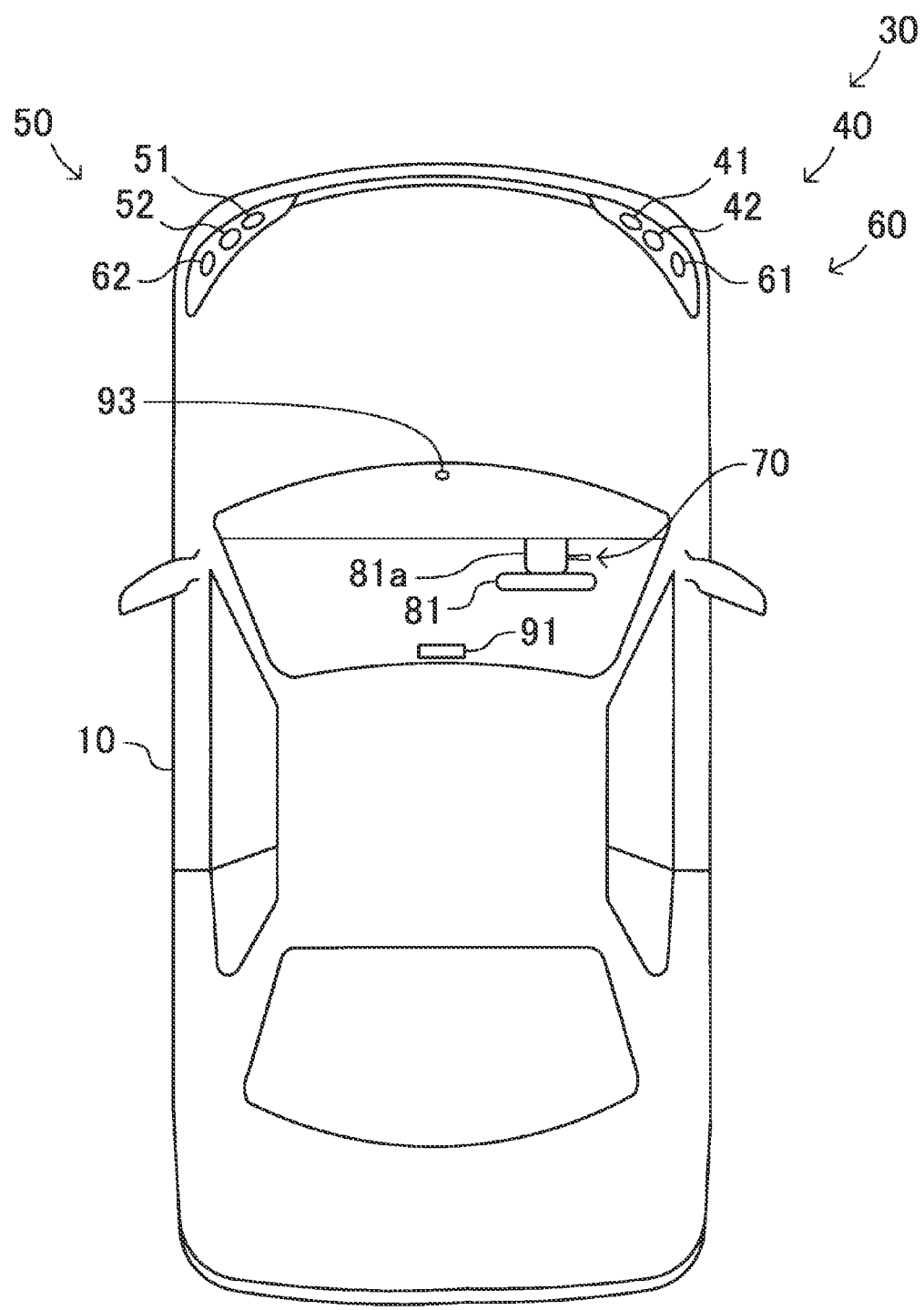
FIG. 1 is a schematic diagram of a vehicle (the vehicle) equipped with a headlamp control device for a vehicle (the control device) according to an embodiment of the disclosure.
Figure 2:
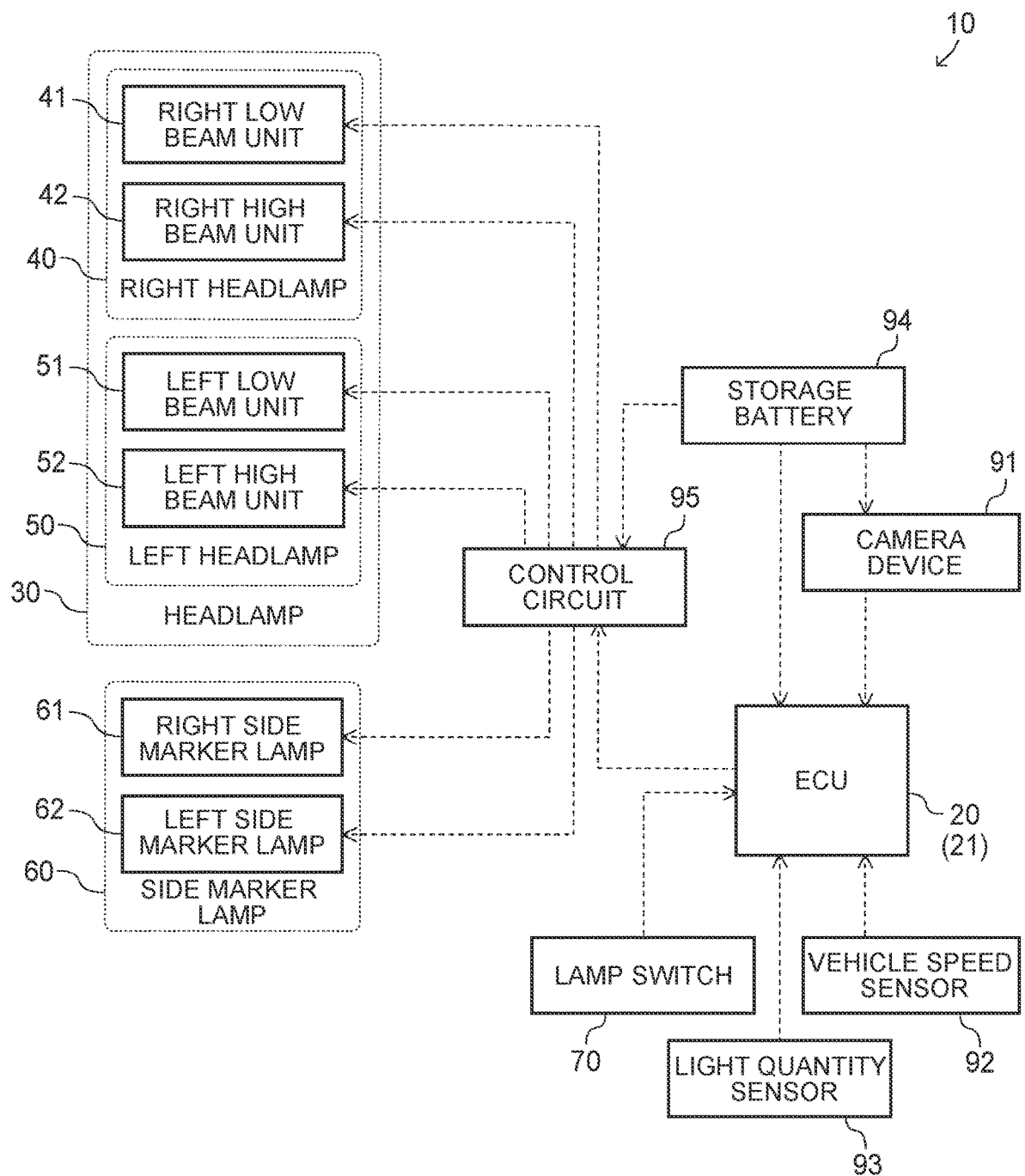
FIG. 2 is a block diagram of the control device.

A headlamp control device for a vehicle according to an embodiment of the disclosure (hereinafter sometimes referred to as the "control device") will be described with reference to the accompanying drawings. The control device is applied to a vehicle 10 shown in FIG. 1. FIG. 2 is a block diagram of the control device. As can be seen from FIG. 2, the control device includes an electronic control unit (ECU) 20.

The ECU 20 includes as a main element a microcomputer that includes a CPU, a nonvolatile memory, and a random access memory (RAM). The CPU reads data, performs numerical calculations, outputs calculation results, etc. by sequentially executing a predetermined program (routine). The nonvolatile memory is a flash memory and stores a program that is executed by the CPU, a lookup table (map) that is referred to during execution of the program, etc. The RAM temporarily stores data that is referred to by the CPU.

The ECU 20 is directly or indirectly connected to a headlamp 30, a side marker lamp 60, a lamp switch 70, a camera device 91, a vehicle speed sensor 92, a light quantity sensor 93, a storage battery 94, and a control circuit 95.

Configuration of Headlamp and Side Marker Lamp

The headlamp 30 includes a right headlamp 40 and a left headlamp 50. The right headlamp 40 includes a right low beam unit 41 and a right high beam unit 42. The left headlamp 50 includes a left low beam unit 51 and a left high beam unit 52. As shown in FIG. 1, the right headlamp 40 is mounted in the right front part of the vehicle 10, and the left headlamp 50 is mounted in the left front part of the vehicle 10.

When the right low beam unit 41 and the left low beam unit 51 are on, the right low beam unit 41 and the left low beam unit 51 emit visible light to a predetermined "low beam distribution area." When the right high beam unit 42 and the left high beam unit 52 are on, the right high beam unit 42 and the left high beam unit 52 emit visible light to a predetermined "high beam distribution area." The low beam distribution area is an area located ahead of and relatively close to the vehicle 10, and the high beam distribution area is an area located ahead of and farther away from the vehicle 10 than the low beam distribution area is.

The state (i.e., the illumination mode of the headlamp 30) in which the right low beam unit 41 and the left low beam unit 51 are on and the right high beam unit 42 and the left high beam unit 52 are off is hereinafter sometimes referred to as the "low beam mode." The state in which the right high beam unit 42 and the left high beam unit 52 are on in addition to the right low beam unit 41 and the left low beam unit 51 is hereinafter sometimes referred to as the "high beam mode."

The side marker lamp 60 includes a right side marker lamp 61 and a left side marker lamp 62. As shown in FIG. 1, the right side marker lamp 61 is mounted in the right front corner of the vehicle 10, and the left side marker lamp 62 is mounted in the left front corner of the vehicle 10.

Configuration of Lamp Switch

Figure 3:
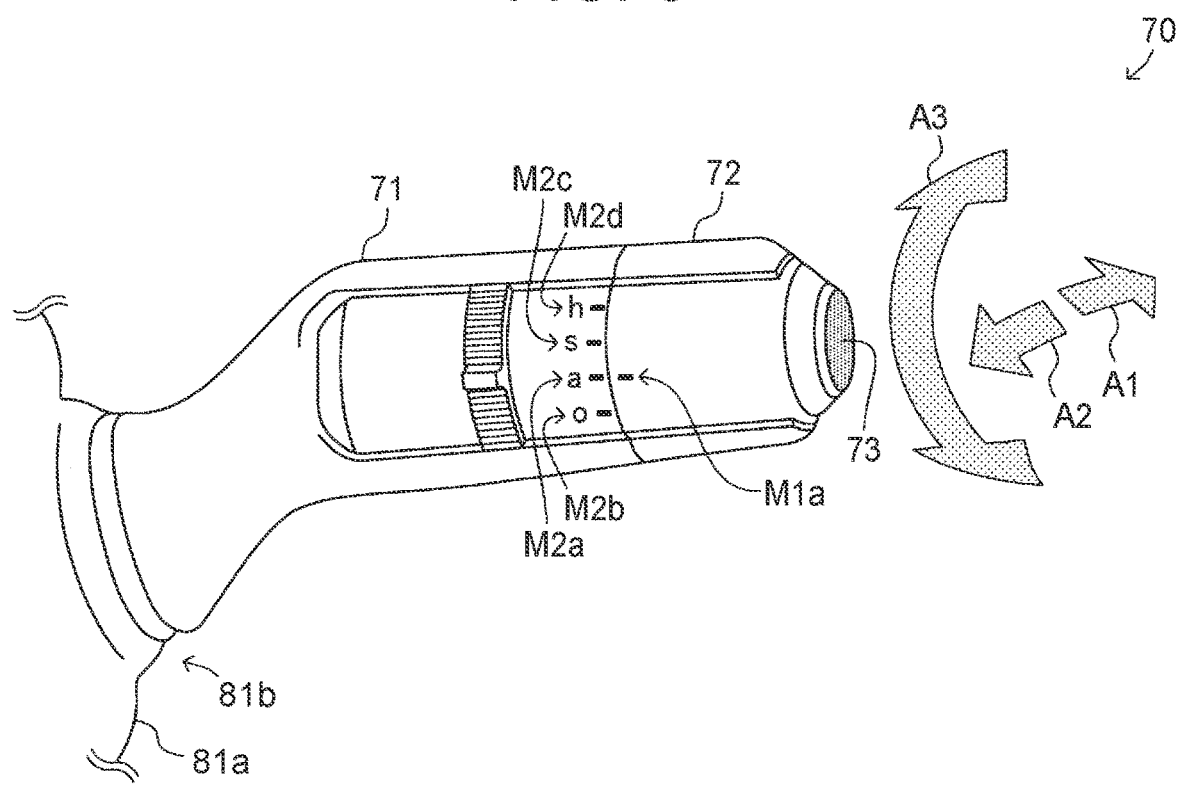
FIG. 3 is a diagram of a lamp switch of the vehicle.

As shown in FIG. 3, the lamp switch 70 includes a high beam switch 71, a dimmer switch 72, and an automatic high beam (AHB) switch 73. As shown in FIG. 1, the lamp switch 70 is mounted on a steering column 81a of a steering wheel 81 so as to extend to the right when viewed by the driver of the vehicle 10.

More specifically, as shown in FIG. 3, the high beam switch 71 is a lever switch that extends in the radial direction of the steering column 81a from a lever base 81b mounted on the steering column 81a. The dimmer switch 72 and the AHB switch 73 are provided at the tip end of the high beam switch 71 (i.e., the opposite end of the high beam switch 71 from the lever base 81b).

The high beam switch 71 can be rotated (tilted) by a predetermined angle in a predetermined direction (the longitudinal direction of the vehicle 10) about the lever base 81b as a pivot point (the center of rotation). The high beam switch 71 is in a neutral position when not operated by the driver. At this time, the operation mode of the high beam switch 71 is an "off mode."

When the high beam switch 71 in the neutral position is rotated by the driver so that the tip end of the high beam switch 71 is moved away from the driver (i.e., toward the front of the vehicle 10) (namely, when the driver pushes the tip end of the high beam switch 71 in the direction of arrow A1 in FIG. 3), the operation mode of the high beam switch 71 is switched to an "on mode." At this time (namely, once the operation mode of the high beam switch 71 is switched from the off mode to the on mode), the on mode of the high beam switch 71 is maintained even when the driver releases his/her hand from the high beam switch 71.

When the high beam switch 71 in the on mode is returned to the neutral position by the driver, the operation mode of the high beam switch 71 is switched to the off mode.

When the high beam switch 71 in the neutral position is rotated by the driver so that the tip end of the high beam switch 71 is moved toward the driver (namely, when the driver pulls the tip end of the high beam switch 71 in the direction of arrow A2 in FIG. 3), the operation mode of the high beam switch 71 is switched to a "flash mode." At this time (namely, when the operation mode of the high beam switch 71 is the flash mode), the high beam switch 71 returns to the neutral position and the operation mode of the high beam switch 71 switches to the off mode when the driver releases his/her hand from the high beam switch 71.

A series of operations from the switching of the operation mode of the high beam switch 71 from the off mode to the flash mode to the returning of the operation mode of the high beam switch 71 from the flash mode to the off mode by the driver is hereinafter sometimes referred to as the "flash operation." The flash operation is also referred to as the "interrupt operation" for convenience. The high beam switch 71 is also used as a "turn signal lever" that is operated by the driver to control the operating state of blinkers (not shown) of the vehicle 10.

The operation mode of the dimmer switch 72 is determined by its rotational position (rotational state) with respect to the high beam switch 71. That is, the dimmer switch 72 is operated by the driver of the vehicle 10 by applying a force in the direction in which the dimmer switch 72 is twisted with respect to the high beam switch 71 (i.e., the direction of arrow A3 in FIG. 3) to the dimmer switch 72.

When a reference symbol M1a (see FIG. 3) on the dimmer switch 72 matches a rotational position symbol M2a on the high beam switch 71, the operation mode of the dimmer switch 72 is an "automatic mode." When the reference symbol Mla matches a rotational position symbol M2b, the operation mode of the dimmer switch 72 is an "off mode." When the reference symbol M1a matches a rotational position symbol M2c, the operation mode of the dimmer switch 72 is a "side marker lamp mode." When the reference symbol M1a matches a rotational position symbol M2d, the operation mode of the dimmer switch 72 is a "headlamp mode."

The AHB switch 73 is a push button at the tip end of the dimmer switch 72 and is movable in the axial direction of the high beam switch 71. Every time the driver depresses the AHB switch 73, the operation mode of the AHB switch 73 is switched between an "on mode" and an "off mode."

Configuration of Others

As shown in FIG. 1, the camera device 91 is mounted near a rearview mirror (not shown) attached to the upper part of a windshield of the vehicle 10 in a passenger compartment. The camera device 91 includes an imaging unit and an image processing unit (both not shown). The imaging unit of the camera device 91 obtains an "image ahead of the vehicle 10" at predetermined time intervals ΔTc by capturing an area ahead of the vehicle 10 and outputs data indicating the image ahead of the vehicle 10 (still image data) to the image processing unit of the camera device 91.

The image processing unit of the camera device 91 detects (extracts) a target (a vehicle other than the vehicle 10 (other vehicle), a pedestrian, etc.) included in the image ahead of the vehicle 10 by a known method (in the present embodiment, template matching). The image processing unit also obtains (estimates) the position of the detected target (the position of the target relative to the vehicle 10) by a known method.

The image processing unit also determines whether at least one of the headlamp and the taillamp of other vehicle included in the image ahead of the vehicle 10 is on. The result of this determination is hereinafter sometimes referred to as the "other vehicle light on/off state."

The image processing unit of the camera device 91 also adds an identifier to the detected target. When a plurality of targets are detected, the image processing unit add different identifiers to the detected targets. When the detected target is the same as a "target included in the previous image ahead of the vehicle 10 obtained by the imaging unit of the camera device 91 (i.e., a target detected the time interval ΔTc before)," the image processing unit adds the same identifier as the previously added one to the detected target.

The image processing unit of the camera device 91 outputs information on the detected target as "target information" to the ECU 20 at the time intervals ΔTc. When any target is detected by the image processing unit, the target information includes the identifier of the detected target, the position of the target, the type of the target (in the present embodiment, "other vehicle," "pedestrian," or "others"). When the type of the detected target is "other vehicle," the target information includes the other vehicle light on/off state of the target (other vehicle).

The vehicle speed sensor 92 detects the vehicle speed Vt that is the traveling speed of the vehicle 10, and outputs a signal indicating the vehicle speed Vt. As shown in FIG. 1, the light quantity sensor 93 is mounted near the front end in the passenger compartment on the upper surface of a dashboard of the vehicle 10. The light quantity sensor 93 detects the quantity of light Lb that is brightness around the light quantity sensor 93, and outputs a signal indicating the quantity of light Lb.

The storage battery 94 supplies electric power to various electrical equipment mounted on the vehicle 10 including the ECU 20 and the control circuit 95. The control circuit 95 distributes the electric power supplied from the storage battery 94 to the headlamp 30, the side marker lamp 60, a taillamp (not shown), etc. according to an instruction from the ECU 20.

Control of Light On/Off State by ECU

The ECU 20 controls the "light on/off state (i.e., the on/off state of the headlamp 30, the side marker lamp 60, etc.)" of the vehicle 10 by controlling the control circuit 95. More specifically, the ECU 20 controls the light on/off state according to the operation mode of the dimmer switch 72 and the operation mode of the high beam switch 71.

When the operation mode of the dimmer switch 72 is the "side marker lamp mode," the ECU 20 turns on an "auxiliary driving lamp." The auxiliary driving lamp includes the side marker lamp 60 and the taillamp. When the operation mode of the dimmer switch 72 is the "headlamp mode," the ECU 20 controls the light on/off state to a "headlamp on state." When the light on/off state is the headlamp on state, the headlamp 30 and the auxiliary driving lamp are on.

When the operation mode of the high beam switch 71 is the "off mode" while the light on/off state is the headlamp on state, the ECU 20 controls the illumination mode of the headlamp 30 to the low beam mode. When the operation mode of the high beam switch 71 is the "on mode" or the "flash mode" while the light on/off state is the headlamp on state, the ECU 20 controls the illumination mode of the headlamp 30 to the high beam mode.

When the operation mode of the dimmer switch 72 is the "automatic mode" and the quantity of light Lb is smaller than a predetermined threshold value Lth (i.e., when it is dark around the vehicle 10), the ECU 20 controls the light on/off state to the headlamp on state. When the operation mode of the dimmer switch 72 is the "automatic mode" and the quantity of light Lb is equal to or larger than the threshold value Lth, the ECU 20 turns off the headlamp 30 and the auxiliary driving lamp. When the operation mode of the dimmer switch 72 is the "off mode," the ECU 20 turns off the headlamp 30 and the auxiliary driving lamp.

AHB Process

When the light on/off state is the headlamp on state and the operation mode of the AHB switch 73 is the "on mode," the ECU 20 performs an "AHB process." The AHB process is a process in which the illumination mode of the headlamp 30 is automatically switched between the high beam mode and the low beam mode. In other words, the ECU 20 performs the AHB process when both of the following conditions (a) and (b1) are satisfied or when all of the following conditions (a), (b2), and (c) are satisfied. The AHB process is sometimes referred to as "automatic illumination control" for convenience.

(a) The operation mode of the AHB switch 73 is the "on mode."

(b1) The operation mode of the dimmer switch 72 is the "headlamp mode."

(b2) The operation mode of the dimmer switch 72 is the "automatic mode."

(c) The quantity of light Lb is smaller than the threshold value Lth (i.e., it is dark around the vehicle 10).

When a "high beam condition" is satisfied during the AHB process, the ECU 20 controls the illumination mode of the headlamp 30 to the high beam mode. The high beam condition is a condition that is satisfied when both of the following conditions (d) and (e) are satisfied.

(d) The vehicle speed Vt is higher than a predetermined speed threshold value Vth.

(e) No "illumination avoidance target" has been detected in an area included in the image ahead of the vehicle 10.

The illumination avoidance target in the condition (e) refers to other vehicle with its headlamp or taillamp on. More specifically, the illumination avoidance target includes other vehicle which is traveling with its taillamp on ahead of the vehicle 10 in the lane in which the vehicle 10 is traveling and other vehicle that is traveling with its headlamp on in a lane in the opposite direction of travel (oncoming lane). The ECU 20 determines whether the condition (e) is satisfied based on the target information received from the camera device 91 (specifically, based on the other vehicle light on/off state of a target of the type "other vehicle").

When the "high beam condition" is not satisfied during the AHB process (that is, when at least one of the conditions (d) and (e) is not satisfied), the ECU 20 controls the illumination mode of the headlamp 30 to the low beam mode.

AHB Process: High Beam Interruption Process

When the flash operation of the high beam switch 71 is performed while the headlamp 30 is in the high beam mode during the AHB process, the ECU 20 starts a "high beam interruption process." The high beam interruption process is a process in which the low beam mode of the headlamp 30 is maintained from the time the flash operation is completed (that is, from the time the operation mode of the high beam switch 71 is switched from the "flash mode" to the "off mode") until an interruption time Tp described below passes.

For example, when a target different from the illumination avoidance target (typically a pedestrian, sometimes referred to as the "illumination target" for convenience) is present ahead of the vehicle 10, the driver performs the flash operation to cause the ECU 20 to start the high beam interruption process. In other words, the high beam interruption process is performed when a target that is different from the illumination avoidance target and that is not desired to be illuminated by light emitted from the right high beam unit 42 and the left high beam unit 52 (that is, the illumination target) is present ahead of the vehicle 10 during the AHB process.

When starting the high beam interruption process, the ECU 20 obtains (determines) the interruption time Tp based on the vehicle speed Vt. The relationship between the vehicle speed Vt and the interruption time Tp is shown by solid line L1 in FIG. 4. As can be seen from solid line L1, when the vehicle speed Vt is equal to the speed threshold value Vth, the interruption time Tp is set to a predetermined time tp2. The interruption time Tp gradually decreases from the time tp2 as the vehicle speed Vt increases in the range in which the vehicle speed Vt is higher than the speed threshold value Vth.

The interruption time Tp is set to a time approximately equal to the time it takes from completion of the flash operation by the driver (that is, from the start of the high beam interruption process) until the vehicle 10 passes the illumination target. However, when the interruption time Tp is too short (that is, when the period during which the illumination mode is the low beam mode is too short), the driver of other vehicle traveling in an oncoming lane (oncoming vehicle) is highly likely to think that the driver of the vehicle 10 flashes headlights at him/her. Accordingly, when the vehicle speed Vt is higher than a "predetermined speed vl that is higher than the speed threshold value Vth," the interruption time Tp is set to a "predetermined time tp1 (fixed value) shorter than the time tp2." The "relationship between the vehicle speed Vt shown by solid line L1 and the interruption time Tp" is stored in the nonvolatile memory of the ECU 20 in the form of a lookup table (map). The vehicle speed Vt at the start of the high beam interruption process is sometimes referred to as the "vehicle speed correlation value" for convenience.

Timing Charts

Figure 5A:
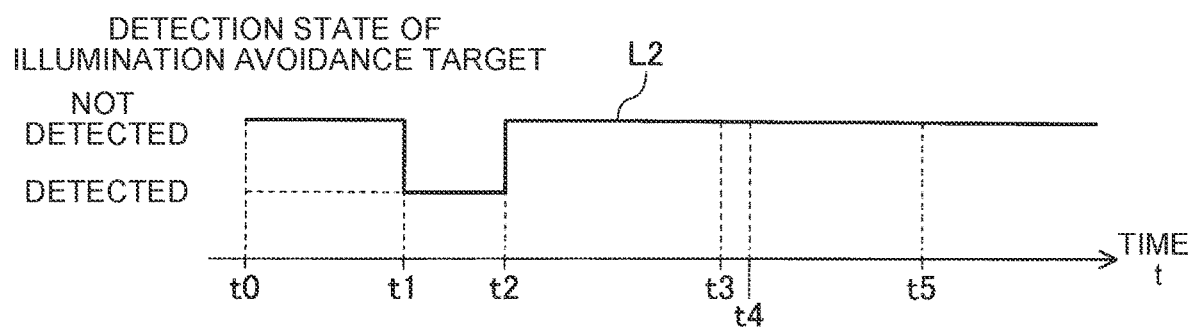
FIG. 5A is timing charts illustrating switching of the illumination mode of a headlamp based on the presence or absence of an illumination avoidance target and execution of a high beam interruption process during an AHB process.
Figure 5B:
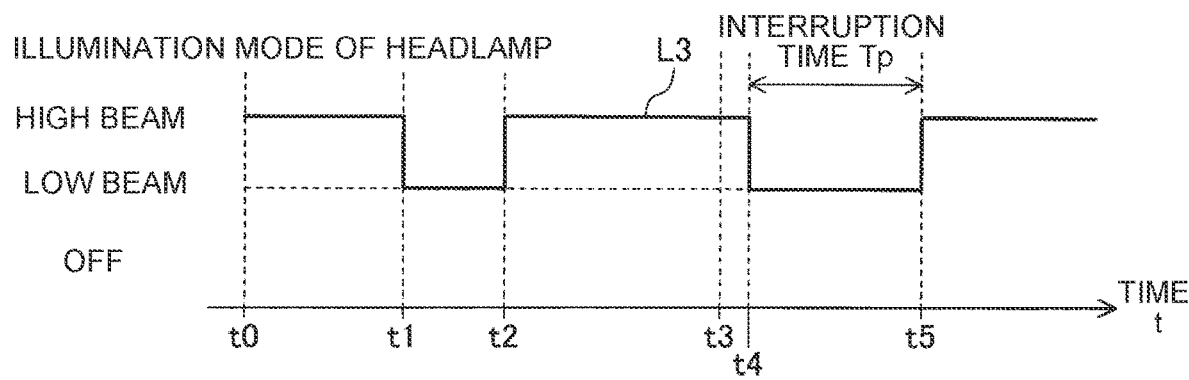
FIG. 5B is timing charts illustrating switching of the illumination mode of a headlamp based on the presence or absence of an illumination avoidance target and execution of a high beam interruption process during an AHB process.
Figure 5C:
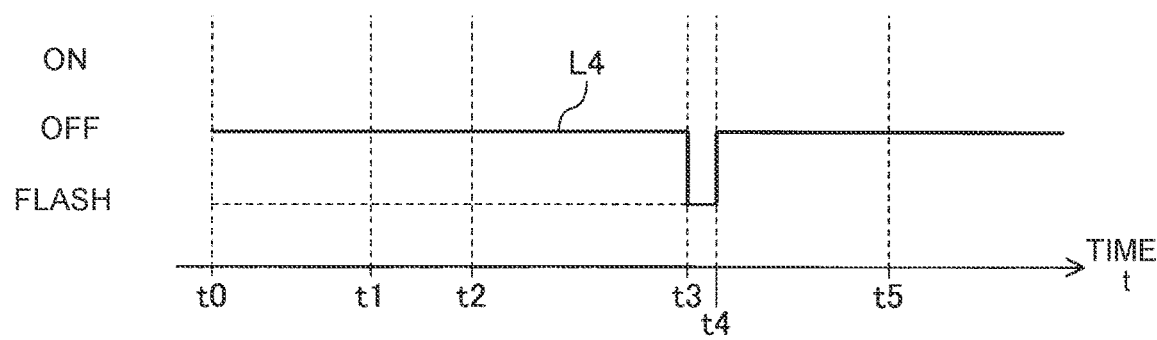
FIG. 5C is timing charts illustrating switching of the illumination mode of a headlamp based on the presence or absence of an illumination avoidance target and execution of a high beam interruption process during an AHB process.

An example in which the illumination mode of the headlamp 30 is switched between the high beam mode and the low beam mode during the AHB process is shown by timing charts in FIGS. 5A to 5C. In the timing charts of FIGS. 5A to 5C, the left end of the abscissa is time t0, followed by time t1, time t2, time t3, time t4, and time t5 in this order from left to right. The interval between time t4 and time t5 is equal to the interruption time Tp described later (i.e., t5−t4=Tp). The AHB process is performed and the vehicle speed Vt is larger than the speed threshold value Vth (i.e., the condition (d) is satisfied) during the period shown in FIGS. 5A to 5C.

In FIG. 5A, broken line L2 indicates the detection state of an illumination avoidance target. As shown by broken line L2, no illumination avoidance target is detected at time t0. Accordingly, as shown by broken line L3 indicating the illumination mode of the headlamp 30 in FIG. 5B, the illumination mode of the headlamp 30 is the high beam mode at time t0.

An illumination avoidance target (e.g., other vehicle traveling with its headlamp on in an oncoming lane (oncoming vehicle)) is then detected at time t1. That is, the condition (e) is no longer satisfied, and therefore the high beam condition is no longer satisfied. Accordingly, the illumination mode of the headlamp 30 switches to the low beam mode at time t1.

The illumination avoidance target is no longer detected (in this example, the vehicle 10 and the oncoming vehicle have passed each other) at time t2. That is, the condition (e) is satisfied, and therefore the high beam condition is satisfied. Accordingly, the illumination mode of the headlamp 30 switches to the high beam mode at time t2.

As shown by broken line L4 indicating the operation mode of the high beam switch 71, the operation mode of the high beam switch 71 is switched from the "off mode" to the "flash mode" by the driver's operation of the high beam switch 71 at time t3. The operation mode of the high beam switch 71 returns to the "off mode" at time t4. That is, the "flash operation" of the high beam switch 71 is performed.

Figure 4:
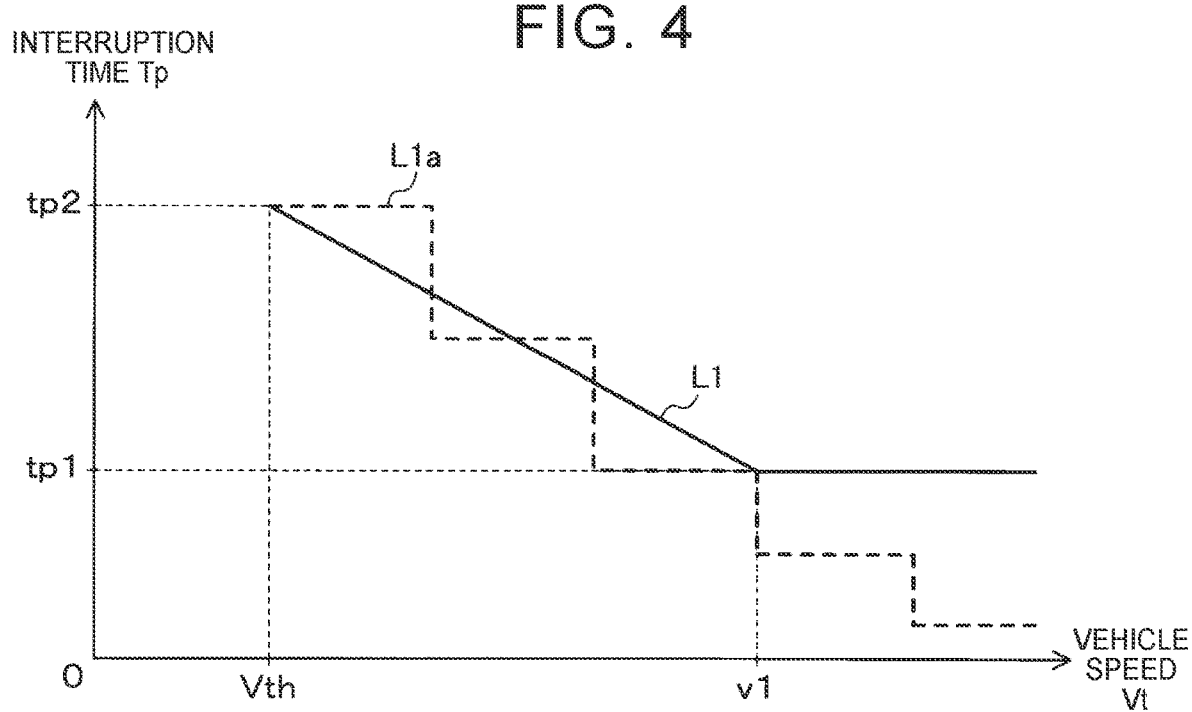
FIG. 4 is a graph showing the relationship between the traveling speed of the vehicle and the interruption time.

Accordingly, the ECU 20 obtains (determines) the interruption time Tp by applying the vehicle speed Vt at time t4 to the relationship shown by solid line L1 in FIG. 4. The ECU 20 also switches the illumination mode of the headlamp 30 from the high beam mode to the low beam mode. That is, the ECU 20 starts the high beam interruption process.

When the interruption time Tp passes from time t4, namely at time t5, the ECU 20 switches the illumination mode of the headlamp 30 from the low beam mode to the high beam mode. That is, the ECU 20 terminates the high beam interruption process.

Specific Operation

Figure 6:
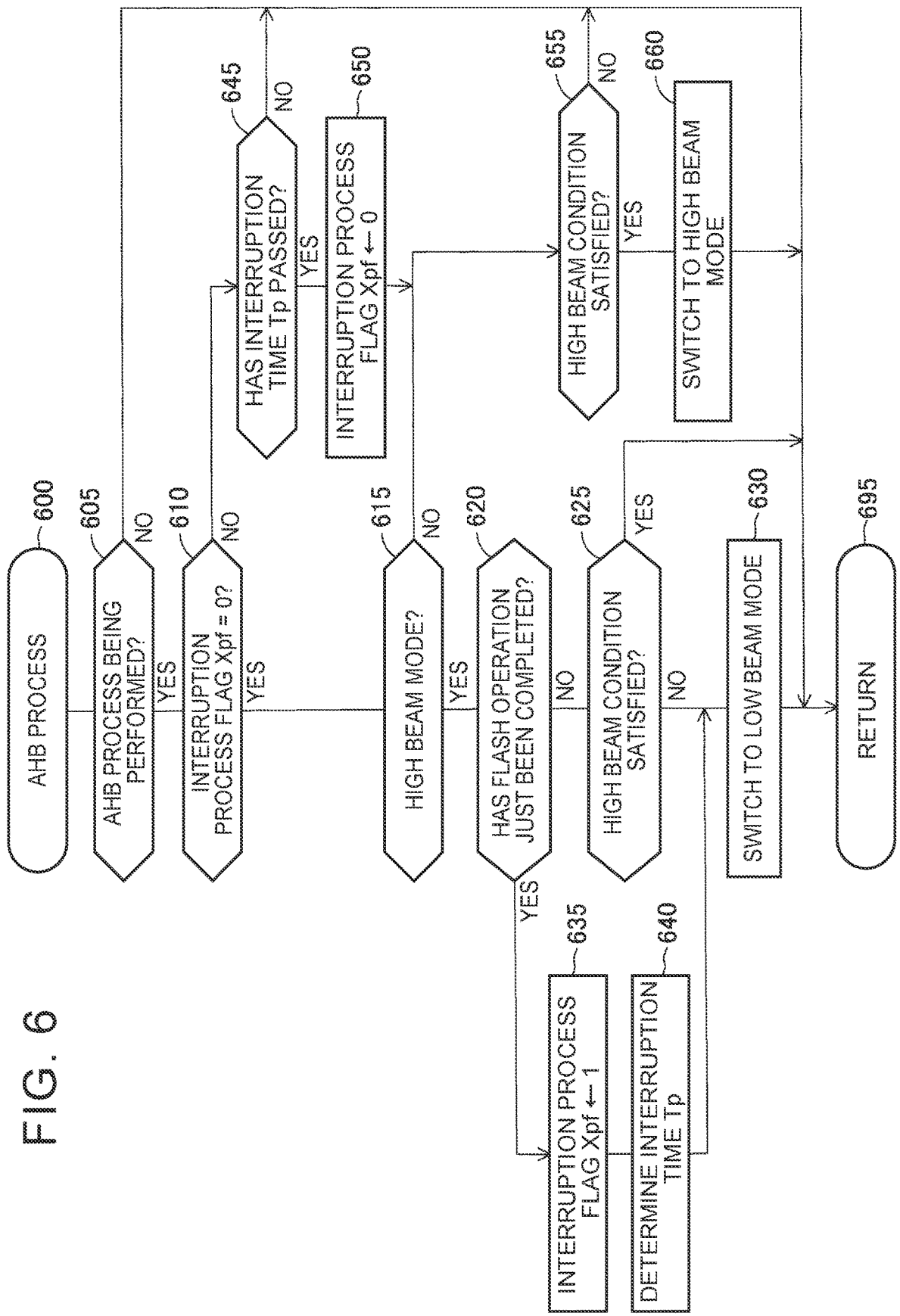
FIG. 6 is a flowchart illustrating an AHB process routine that is executed by the control device.

Next, a specific operation of the ECU 20 related to the AHB process will be described. The CPU of the ECU 20 (hereinafter sometimes simply referred to as the "CPU") executes an "AHB process routine" shown by the flowchart of FIG. 6 at predetermined time intervals.

In this routine, the value of an interruption process flag Xpf is set and is referred to. The value of the interruption process flag Xpf is set to "0" in an initial routine (not shown) that is executed by the CPU when the ECU 20 is started (that is, when an ignition switch (not shown) of the vehicle 10 is switched from off position to on position). As described later, the value of the interruption process flag Xpf is set to "1" while the high beam interruption process is being performed.

Accordingly, the CPU starts the process in step 600 at an appropriate timing and determines whether the AHB process is being performed in step 605. That is, the CPU determines whether the light on/off state is the headlamp on state and the operation mode of the AHB switch 73 is the "on mode" based on whether the conditions (a), (b1), (b2), and (c) are satisfied.

Case A

It is herein assumed that the AHB process is currently being performed, the high beam condition is satisfied (that is, the illumination mode of the headlamp 30 is the high beam mode), and the flash operation of the high beam switch 71 is not being performed. That is, it is assumed that the current time is time t0 in FIGS. 5A to 5C. In this case, since the high beam interruption process is not being performed, the value of the interruption process flag Xpf is "0."

Since the AHB process is being performed, the CPU determines "Yes" in step 605, and the routine proceeds to step 610. In step 610, the CPU determines whether the value of the interruption process flag Xpf is "0". Since the value of the interruption process flag Xpf is "0" based on the above assumption, the CPU determines "Yes" in step 610, and the routine proceeds to step 615. In step 615, the CPU determines whether the illumination mode of the headlamp 30 is the high beam mode.

Since the illumination mode of the headlamp 30 is the high beam mode based on the above assumption, the CPU determines "Yes" in step 615, and the routine proceeds to step 620. In step 620, the CPU determines whether the flash operation of the high beam switch 71 has just been completed. That is, the CPU determines whether the flash operation has been completed in the period since the previous execution of the routine.

Since the flash operation of the high beam switch 71 has not been performed (that is, the flash operation has not been completed in the period since the previous execution of this routine) based on the above assumption, the CPU determines "No" in step 620, and the routine proceeds to step 625. In step 625, the CPU determines whether the high beam condition is satisfied. That is, the CPU determines whether both of the conditions (d) and (e) are satisfied.

Since the high beam condition is satisfied based on the above assumption, the CPU determines "Yes" in step 625, and the routine proceeds to step 695. The CPU terminates the routine in step 695. As a result, the high beam mode of the headlamp 30 is maintained.

Case B

It is herein assumed that an illumination avoidance target is then detected and therefore the high beam condition is no longer satisfied. That is, it is assumed that the current time is time t1 in FIGS. 5A to 5C.

In this case, the CPU determines "No" in step 625, and the routine proceeds to step 630. In step 630, the CPU controls the control circuit 95 so that the illumination mode of the headlamp 30 switches from the high beam mode to the low beam mode. The routine then proceeds to step 695.

Case C

It is herein assumed that the illumination avoidance target is still detected (that is, the high beam condition is still not satisfied). That is, it is assumed that the current time is included in the period after time t1 and before time t2 in FIGS. 5A to 5C.

In this case, since the illumination mode of the headlamp 30 is the low beam mode, the CPU determines "No" in step 615, and the routine proceeds to step 655. In step 655, the CPU determines whether the high beam condition is satisfied. Since the high beam condition is not satisfied based on the above assumption, the CPU determines "No" in step 655, and the routine directly proceeds to step 695. As a result, the low beam mode of the headlamp 30 is maintained.

Case D

It is herein assumed that the illumination avoidance target is then no longer detected and therefore the high beam condition is satisfied. That is, it is assumed that the current time is time t2 in FIGS. 5A to 5C.

In this case, the CPU determines "Yes" in step 655, and the routine proceeds to step 660. In step 660, the CPU controls the control circuit 95 so that the illumination mode of the headlamp 30 switches from the low beam mode to the high beam mode. The routine then proceeds to step 695.

Case E

It is herein assumed that the driver has then performed the flash operation. That is, it is assumed that the current time is time t4 in FIGS. 5A to 5C.

In this case, the CPU determines "Yes" in step 620, and the routine proceeds to step 635. In step 635, the CPU sets the value of the interruption process flag Xpf to "1." The routine then proceeds to step 640. In step 640, the CPU obtains (determines) the interruption time Tp by applying the current vehicle speed Vt to the "relationship between the vehicle speed Vt and the interruption time Tp shown by solid line L1 in FIG. 4."

The routine then proceeds to step 630. That is, in this case, the high beam interruption process is started.

Case F

It is herein assumed that the high beam interruption process has been started and the interruption time Tp has not passed. That is, it is assumed that the current time is included in the period after time t4 and before time t5 in FIGS. 5A to 5C.

In this case, since the value of the interruption process flag Xpf is "1," the CPU determines "No" in step 610, and the routine proceeds to step 645. In step 645, the CPU determines whether the "interruption time Tp obtained in step 640" has passed since the start of the high beam interruption process. Since the interruption time Tp has not passed based on the above assumption, the CPU determines "No" in step 645, and the routine directly proceeds to step 695. As a result, the low beam mode of the headlamp 30 is maintained.

Case G

It is herein assumed that the interruption time Tp has then passed since the start of the high beam interruption process. That is, it is assumed that the current time is time t5 in FIGS. 5A to 5C. It is also assumed that the high beam condition is currently satisfied.

In this case, the CPU determines "Yes" in step 645, and the routine proceeds to step 650. In step 650, the CPU sets the value of the interruption process flag Xpf to "0." The routine then proceeds to step 655. Since the high beam condition is currently satisfied based on the above assumption, the routine then proceeds to step 660. In step 660, the illumination mode of the headlamp 30 switches from the low beam mode to the high beam mode.

When the high beam condition is not satisfied after the elapse of the interruption time Tp since the start of the high beam interruption process, the CPU determines "No" in step 655 after step 650, and the routine proceeds to step 695. Accordingly, the low beam mode of the headlamp 30 is maintained.

When the condition in step 605 is not satisfied (that is, when the AHB process is not being performed), the CPU determines "No" in step 605, and the routine directly proceeds to step 695. When the AHB process is to be stopped during the high beam interruption process, the CPU executes a routine, not shown, to set the value of the interruption process flag Xpf to "0."

Modification of Embodiment

Next, a modification of the control device (the modified device) will be described. The ECU 20 of the above control device obtains the interruption time Tp based on the vehicle speed Vt at the start of the high beam interruption process. An ECU 21 of the modified device is different from the ECU 20 only in that the ECU 21 obtains (determines) the interruption time Tp based on the presence or absence of an "illumination target."

More specifically, when a target of the type "pedestrian" has been detected at the start of the high beam interruption process, the ECU 21 determines that the target is an illumination target. When no illumination target is present, the ECU 21 obtains the interruption time Tp by applying the vehicle speed Vt to the "relationship between the vehicle speed Vt and the interruption time Tp shown by solid line L1 in FIG. 4," like the ECU 20.

When an illumination target is present, the ECU 21 obtains (calculates) the interruption time Tp by dividing the "longitudinal distance Dx between the vehicle 10 and the illumination target in the longitudinal direction of the vehicle 10" by the "relative speed Vx of the illumination target with respect to the vehicle 10 in the longitudinal direction of the vehicle 10" (i.e., Tp=Dx/Vx).

The ECU 21 obtains the longitudinal distance Dx based on the position of the illumination target included in the target information received from the camera device 91 (specifically, the image processing unit of the camera device 91). The ECU 21 also obtains (calculates), as the magnitude of the relative speed Vx, the difference between the "longitudinal distance Dx obtained based on the most recently received target information (most recent target information)" and the "longitudinal distance Dx obtained based on the previously received target information (previous target information)" divided by the time interval ΔTc. The previous target information is target information received the time interval ΔTc before the most recent target information.

As described above, according to the control device and the modified device, the interruption time Tp is appropriately set when the high beam interruption process is performed during the AHB process. The illumination mode of the headlamp 30 therefore switches from the low beam mode to the high beam mode before the vehicle 10 passes an illumination target. This configuration reduces the possibility of the event in which the illumination target is illuminated by the headlamp 30 in the high beam mode for a long time and the event that the high beam mode of the headlamp 30 is maintained for a long time after the vehicle passes the illumination target. The control device and the modified device are more likely to avoid the driver from feeling dissatisfied with the high beam interruption process.

According to the modified device, the interruption time Tp is more appropriately obtained based on the position of an illumination target detected by the camera device 91 at the start of the high beam interruption process. As a result, the difference between the timing at which the vehicle 10 passes the illumination target and the timing at which the high beam interruption process is terminated is more likely to be reduced.

The embodiment of the headlamp control device for a vehicle according to the disclosure (that is, the control device and the modified device) are described above. However, the disclosure is not limited to the above embodiment, and various modifications can be made without departing from the spirit and scope of the disclosure. For example, the control device and the modified device detect a target (i.e., an illumination avoidance target and an illumination target) using the camera device 91. However, the control device and the modified device may detect a target using a different target detection device (e.g., a millimeter wave radar device or a Light Detection and Ranging (LiDAR) device) instead of, or in addition to, the camera device 91.

The control device and the modified device according to the embodiment determines (confirms) the interruption time Tp when an interruption operation is performed (that is, when the high beam interruption process is started). However, the control device or the modified device may correct the interruption time Tp during the high beam interruption process based on the vehicle speed Vt. For example, the control device or the modified device may correct the interruption time Tp, namely reduce the interruption time Tp, when the current vehicle speed Vt becomes higher than the "vehicle speed Vt at the start of the high beam interruption process" during the high beam interruption process.

In the control device and the modified device according to the embodiment, the interruption operation is the flash operation that is performed using the high beam switch 71. However, the interruption operation may be an operation different from the flash operation (e.g., an operation on a push button (not shown) provided on the dashboard of the vehicle 10).

The control device according to the embodiment obtains the interruption time Tp by applying the vehicle speed Vt to the "relationship between the vehicle speed Vt and the interruption time Tp shown by solid line L1 in FIG. 4." However, the control device may obtain the interruption time Tp by a different method. For example, the control device may obtain the interruption time Tp by applying the vehicle speed Vt to the "relationship between the vehicle speed Vt and the interruption time Tp shown by dashed line Lla in FIG. 4.

The modified device according to the embodiment extracts a target determined to be of the type "pedestrian" as an illumination target. However, targets other than pedestrians may be extracted as illumination targets. For example, the image processing unit of the camera device 91 may classify a target as one of "other vehicle," "pedestrian," "bicycle," and "others," and the ECU 21 may extract the target classified as "pedestrian" or "bicycle" as an illumination target.

What is claimed is:

1. A headlamp control device for a vehicle, comprising:
    a headlamp mounted on the vehicle and configured to illuminate ahead of the vehicle in an illumination mode that is either a low beam mode or a high beam mode; and
    a control unit that performs automatic illumination control in which the illumination mode of the headlamp is automatically switched between the low beam mode and the high beam mode based on a traveling state of the vehicle, wherein
    the control unit is configured so that, when an occupant of the vehicle performs a predetermined interruption operation while the illumination mode is the high beam mode during the automatic illumination control, the control unit sets the illumination mode to the low beam mode until an interruption time passes, the interruption time being set to a smaller value as a vehicle speed correlation value is larger, and the vehicle speed correlation value being a value that increases as a speed at which the vehicle has been traveling since the start of the interruption operation is higher.

2. The headlamp control device for the vehicle according to claim 1, further comprising:
    a target information obtaining unit configured to detect an illumination target and obtain a distance between the detected illumination target and the vehicle, the illumination target being a target of a specific type, which is located ahead of the vehicle, wherein
    the control unit is configured so that, in a case where the illumination target has been detected when the interruption operation is performed while the illumination mode is the high beam mode during the automatic illumination control, the control unit sets the interruption time to a larger value as the distance between the illumination target and the vehicle is larger.

* * * * *